PATENTED FEB 23 1971   3,565,161
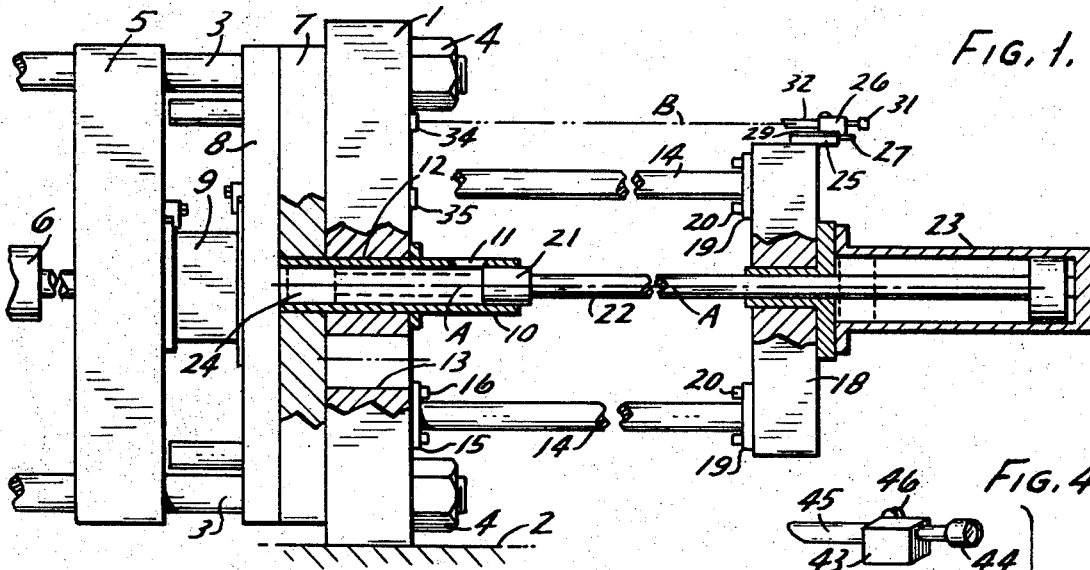
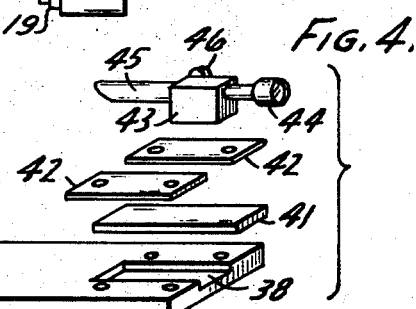
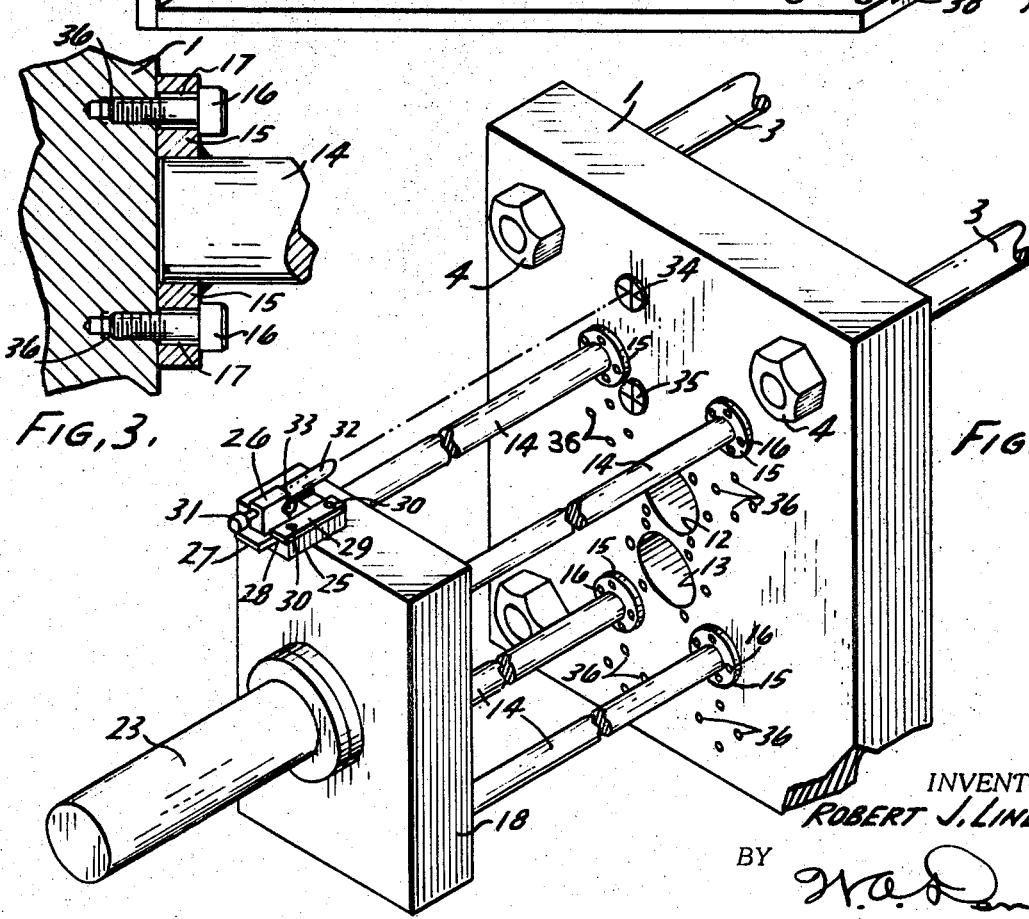
INVENTOR.
ROBERT J. LINDSEY
BY
*W. A. Denny*
ATTORNEY

United States Patent

[11] 3,565,161

| [72] | Inventor | Robert J. Lindsey<br>Marion, Ohio |
|---|---|---|
| [21] | Appl. No. | 634,771 |
| [22] | Filed | Apr. 28, 1967 |
| [45] | Patented | Feb. 23, 1971 |
| [73] | Assignee | Koehring Company<br>Milwaukee, Wis. |

[54] SHOT END ALIGNMENT FOR DIE-CASTING MACHINES
1 Claim, 4 Drawing Figs.

[52] U.S. Cl. .................................................. 164/312;
29/464; 29/465; 33/6
[51] Int. Cl. .................................................. B22d 17/08,
B22d 17/04
[50] Field of Search .................................................. 29/464,
465, 407; 356/153; 350/81; 308/4; 33/6; 164/312

[56] References Cited
UNITED STATES PATENTS

| 3,192,631 | 7/1965 | Goguen et al. .............. | 356/153 |
| 3,386,781 | 6/1968 | Blazek et al. .............. | 29/465 |
| 2,869,177 | 1/1959 | Jurgeleit .................... | 308/4 |

*Primary Examiner*—John F. Campbell
*Assistant Examiner*—Robert J. Craig
*Attorneys*—William A. Denny, John F. Friedl and Wenzel Zierold ABSTRACT: A method and apparatus in which a predetermined transversely displaced reference axis is used for effecting axial alignment of the injection unit and injection cylinder of a die-casting machine.

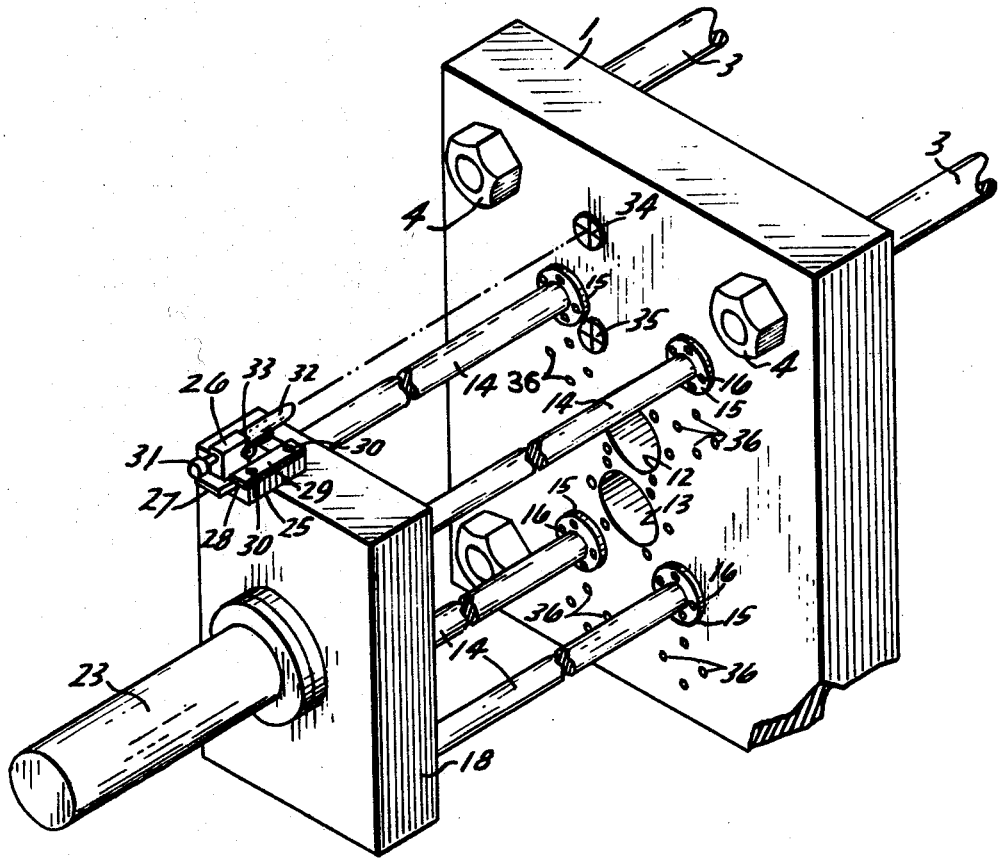

SHOT END ALIGNMENT FOR DIE-CASTING MACHINES

This invention relates generally to die-casting machines of the cold chamber type wherein an injection cylinder forms a shot chamber for receiving a charge of molten material which is forcibly injected by a plunger into a die cavity. More particularly, the present invention relates to a method and apparatus for the precise, routine, axial alignment of the plunger rod on the injection unit of the machine and the axis of the shothole in the stationary platen of the machine, said alignment being accomplished by adjusting the machine with respect to a transversely displaced reference axis.

In die-casting equipment of the type to which the present invention relates it is essential that there be proper alignment of the axis of the shot cylinder rod and plunger and the axis of the shothole in the stationary platen. Improper alignment thereof may result in scoring of the injection cylinder mounted in the shothole with concomitant leakage of the molten material, and reduction in shot pressure adversely affecting the efficiency of the machine and the quality of the castings. The shothole and the injection unit are usually aligned during original assembly in the manufacturer's plant by using expensive, precision optical instrumentation mounted in the shothole of the machine. The injection unit is aligned with respect to the shothole by adjustment of the support rods between the injection unit and the stationary platen until the piston rod plunger is optically centered on the center of the shothole. The support rods are then secured to the platen. A similar procedure is effected for each shothole on machines having more than one shothole.

During the course of the machine's life, the injection unit of the machine is likely to be removed many times for various reasons, such as shipment, conversion to use of another shothole, change of die sections, normal maintenance, and overhaul. Upon reassembly, the injection unit must be realigned with respect to the stationary platen. Furthermore, during operation of the machine it may become necessary to realign the injection unit because of the substantial shocks to which the machine is subjected or because of settling of the foundation. Thus it is important not only to be able to realign the machine when necessary, but also to check the alignment of the machine during operation.

To realign the machine after it has been set up in a casting plant according to the method used in the factory requires the use of the expensive, delicate instrumentation mentioned above which is usually not available in the typical die-casting plant and would, in any case, require removal of the die sections to clear the shothole for the necessary line-of-sight view which is required in using the factory method. Where the expensive delicate instrumentation described above is not available or where the operator does not wish to remove the die sections form the machine to effect alignment thereof, the normal practice has been to use feeler gauges to obtain a uniform clearance around the piston plunger as it rests in the injection cylinder. This does not provide for accurate alignment because of the close tolerances involved. Further, it is difficult to obtain the desired alignment using feeler gauges on any more than one point on the stroke of the piston rod.

The present invention refers to a method and apparatus for the precise alignment of the injection unit with the shothole in the stationary platen of a die-casting machine under actual working conditions. More specifically this invention refers to a method and apparatus to ascertain precise alignment between the common axis of the shot cylinder, piston rod and plunger on the injection unit with the common axis of the shothole and injection cylinder on the stationary platen by establishing a reference axis transversely displaced from the axis of alignment of these common axes and by adjusting the injection unit on the machine with respect to the reference axis.

Generally, it is an object of the invention to provide an improved method of assembling a die-casting machine of the mentioned character.

More specifically, it is an object of the invention to provide an improved method of reestablishing precise alignment of the injection unit and platen of a die-casting machine when such alignment has become deranged, be it due to disassembly of the machine or due to other causes such as strains and stresses of its components parts incident to normal die-casting operations.

A further object of the invention is to provide an improved die-casting machine of the mentioned character wherein the injection unit and platen are relatively adjustable to establish precise alignment thereof on a common axis, and to provide the injection unit and platen with complementary sighting means which are in precise alignment with each other on a reference axis at a transverse spacing from said common axis when the injection unit and platen are in precise alignment with each other on said common axis.

Another object of the invention is to provide an improved method and apparatus to check the alignment of the injection unit with respect to the stationary platen of a die-casting machine while the machine is set up for casting operations.

These and other objects and advantages of the present invention will appear hereinafter in this disclosure and by reference to the accompanying drawings, in which:

FIG. 1 is a side elevational view of a portion of a casting machine utilizing the present invention, certain parts being shown in section, broken away or removed for clarity and illustrating the position of various parts of the machine;

FIG. 2 is a perspective side view of a portion of the machine, with certain parts removed and again incorporating the invention;

FIG. 3 is a side elevational view of a portion of the machine expanded for clarity and illustrating the adjustment of the injection unit with respect to the stationary platen;

FIG. 4 is a partially exploded perspective view of a calibration fixture for calibrating optical devices, such as telescopes, for use with this invention.

Referring in more detail to the drawings, a stationary platen 1 rests securely on a suitable support 2 such as a machine base. Generally horizontal parallel guide rods 3 extend through the stationary platen and are secured thereto by conventional means, such as nuts 4. These rods are smoothly finished and act as guide ways for a movable platen 5 which is slideably mounted thereon and reciprocable by conventional means such as, for example, a hydraulic ram 6. A die plate 7 is secured to the inner surface of the stationary platen and dies 8, 9 are securely and removably placed between the movable platen and the die plate 7 as for conventional die-casting purposes.

A removable injection cylinder 10 with charge opening 11 is precisely journaled in a close fitting relationship in a shothole 12 provided in the stationary platen 1. An alternate shothole 13 may be provided in the stationary platen for use with different die plates and dies for different applications. It is understood, however, that normally only one shothole is used for a given die and that other shotholes, not shown, may be provided if the other dies used require different locations.

Support rods 14 are removably and adjustably secured at one end to the stationary platen 1 by conventional means such as mounting flange 15 and bolts 16. To allow the support rods 14 to be adjustable with respect to the stationary platen 1, openings 17 (FIG. 3) are provided in the flanges 15 which are slightly larger than the diameter of the securing bolts 16. If desired, other equally effective means map be provided for making this adjustment. The support rods 14 are secured at their opposite ends to an injection yoke 18 by mounting flanges 19 and bolts 20. A piston plunger 21 adapted for close fitting relationship within the injection cylinder bore 11 and reciprocable therein has a piston rod 22 extending rearwardly therefrom through an opening in the injection yoke 18 for reciprocation by any suitable means such as a double-acting hydraulic shot cylinder 23 secured to the injection yoke. It is to be understood that a common axis A of the piston rod 22, the shothole 12 and injection cylinder 10 is attained upon proper adjustment of the support rods 14 in relation to the stationary platen 1.

In the general operation of the machine, die sections 8, 9 are closed together against the die plate 7 by reciprocation of the hydraulic ram 6 and the piston plunger 21 is located in the end of the injection cylinder 10 as shown in FIG. 1. A charge of molten material is then placed in the injection cylinder 10 through the charge opening 11 whereupon the plunger 21 drives the charge into the cavity, not shown, of the die sections 8, 9. Upon solidification of the material in the die sections and the "biscuit" of material in the end of the sleeve, the die sections are opened, and the plunger 21 follows forward as shown in phantom at 24 and ejects the "biscuit." The casting is then removed and the plunger is then returned to its original position.

To provide means for establishing a transversely displaced reference axis, an anchor block or mounting pad 25 is secured on the injection yoke 18. An optical device, such as a telescope 26 is secured in a predetermined angular relationship of its axis to a mounting block or seating element 27 which is designed for removable, precise, close interfitted relationship with the anchor block 25. Such precise relationship presents the optical axis of the telescope in predetermined angular relation to the injection unit 18, 21, 22, 23 and may be affected by a machined channel 28 and the telescope may be firmly but removably held therein by fastener plates 29 secured by bolts 30. The telescope is equipped with precision point indicating means, such as crosshairs, not shown, and has an eyepiece 31, barrel 32 and focusing means 33.

When the axis A of the piston rod 22, shothole 12 and bore of the injection cylinder 10 has been ascertained by optical inspection in the conventional manner and by fixing the support rods 14 in relation to the stationary platen 1 and injection yoke 18, the telescope 25 is focused on a point on the stationary platen 1. A target 34 is placed on the stationary platen such that its center is coincident to such point and is permanently secured to the stationary platen 1. It is to be understood, of course, that the point on the stationary platen could be marked by other means. Thus a reference axis B is fixed in permanent relation to the coincident axis A of the piston rod 22, shothole 12 and bore of the injection cylinder 10. Similar steps are used to ascertain other targets on the platen for other shotholes thereon and similar reference axes are thus determined. Thus, referring to FIG. 2, showing shotholes 12, 13 without placement of injection cylinders therein, targets 34 and 35 have been placed on the stationary platen 1 in the manner described above, the target 34 being located for ascertaining the proper alignment of the piston rod with shothole 12 and target 35 being located for ascertaining the proper alignment of the piston rod in the stationary platen 1 to attach the support rods 14 with respect to the additional shothole 13.

Thus, to align the machine in accordance with the present invention, bolts 16 are loosened, the support rods 14 are adjusted in relation to the stationary platen 1 until the crosshairs of the telescope 26 focus on center of the target 34. Bolts 16 are then secured and the axial alignment of the plunger 21, piston rod 22, shothole 12 and injection cylinder 10 will have been established.

In the preferred embodiment of the invention the reference axis B will be established in a parallel relation to the common axis A, it being obvious, however, that such is not a requirement for the useful application thereof.

Generally, the telescoping 26 and target 34 represent complementary sighting means on the injection unit 18, 21, 22, 23 and platen 1, respectively, which are in precise alignment with each other on the reference axis B at a transverse spacing from the common axis A when the injection unit and platen are in precise alignment with each other on the common axis A.

Because of the possibility of substantial shock during the operation of the machine it is desirable that the telescope 26 be removable therefrom, thus fastener plates 29 have been provided which hold the telescope firmly to the anchor block 25 on the injection yoke 18, by conventional fastener means, such as bolts 30.

Since the telescope is removable, it can be used to align many machines, provided the machines are set up so that the reference axis B is ascertainable. Further it is clear that substitute telescopes can be used to align the machines provided each substitute telescope is positioned on its mounting block in precisely the same position as the original telescope is positioned on its mounting block. Thus, if the original telescope is lost or destroyed, a substitute telescope is available. Apparatus for obtaining the precise duplicative positioning of a substitute telescope on a mounting block is shown in FIG. 4 wherein a calibration bar 37 is provided with a machined channel 38 and an end block 39 with a prepositioned target 40 thereon. The target 40 on the end block 39 and the machined channel 38 are arranged on the calibration bar 37 in precisely the same relationship as the target 34 and the machined channel 28 are positioned on the properly aligned machine as seen in FIGS. 1 and 2. It is understood that the machined channel 38 in the calibration bar 37 is the same size and configuration as the machined channel 28 in the anchor block 25 on the machine.

Thus, referring again to FIG. 4, to calibrate a substitute telescope, a mounting block 41 of the same size and configuration as the mounting block 27 best seen in FIG. 2, is placed in the machined channel 38 and removably clamped in place by fastener plates 42 which are bolted to the calibration bar 37. A substitute telescope 43 having an eyepiece 44, barrel 45, focusing means 46, and crosshairs, not shown, is then placed on the clamped mounting block 41 and shimmed or otherwise adjusted until it focuses properly on the center of the target 40. The substitute telescope 43 is then permanently secured in any convenient manner to the mounting block 41. The substitute telescope with affixed mounting block is then removed from the calibration bar and is ready to be used in the alignment of die-casting machines as described herein.

With the present invention a simple, economical, fast and effective means is provided for the precise alignment of the shot cylinder piston rod and the shothole for a die-casting machine under actual working conditions.

I claim:

1. A die-casting machine comprising a platen having a first and second shothole; an injection cylinder selectively mountable in one or the other of said shotholes; a piston rod and piston operatively associated with said cylinder; a yoke reciprocably mounting said piston rod; releasable connecting means between said platen and yoke operable to position said piston rod selectively on a first common axis with said first shothole or on a second common axis with said second shothole; first sighting means on said yoke and second sighting means secured to said platen so as to be aligned with said first sighting means on a first reference axis spaced transversely from said first common axis when said piston rod is aligned with said first shothole; and third sighting means secured to said platen so as to be aligned with said first sighting means on a second reference axis spaced from said second common axis when said piston rod is aligned with said second shothole.